(12) United States Patent
Fukushima et al.

(10) Patent No.: US 6,840,448 B2
(45) Date of Patent: Jan. 11, 2005

(54) PORTABLE INFORMATION PROCESSING APPARATUS

(75) Inventors: Shinichiro Fukushima, Yokohama (JP); Yutaka Takami, Yokohama (JP); Atsushi Yoshioka, Ebina (JP); Isao Nakagawa, Yokohama (JP); Shuzo Matsumoto, Fujisawa (JP); Kiyoharu Kishimoto, Yokohama (JP)

(73) Assignees: Hitachi, Ltd., Tokyo (JP); Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 10/462,840

(22) Filed: Jun. 17, 2003

(65) Prior Publication Data

US 2004/0041025 A1 Mar. 4, 2004

(30) Foreign Application Priority Data

Jun. 21, 2002 (JP) ......................................... 2002-180776

(51) Int. Cl.[7] .............................................. G06K 7/08
(52) U.S. Cl. ...................................... 235/451; 235/492
(58) Field of Search ................................ 235/451, 492, 235/486, 441

(56) References Cited

U.S. PATENT DOCUMENTS

| | | | | |
|---|---|---|---|---|
| 4,208,869 A | * | 6/1980 | Hanaoka | 368/84 |
| 5,227,988 A | * | 7/1993 | Sasaki et al. | 708/131 |
| 5,619,529 A | * | 4/1997 | Fujioka | 235/380 |
| 5,714,741 A | * | 2/1998 | Pieterse et al. | 235/380 |
| 5,809,633 A | * | 9/1998 | Mundigl et al. | 235/380 |
| 5,933,328 A | * | 8/1999 | Wallace et al. | 439/326 |
| 6,036,100 A | * | 3/2000 | Asami | 235/492 |
| 6,367,701 B1 | * | 4/2002 | Fries | 235/486 |
| 6,378,774 B1 | * | 4/2002 | Emori et al. | 235/492 |
| 6,412,702 B1 | * | 7/2002 | Ishikawa et al. | 235/492 |
| 6,600,219 B2 | * | 7/2003 | Higuchi | 257/679 |
| 6,634,564 B2 | * | 10/2003 | Kuramochi | 235/492 |
| 6,659,356 B2 | * | 12/2003 | Kashima | 235/492 |

FOREIGN PATENT DOCUMENTS

| | | | |
|---|---|---|---|
| EP | 945826 A2 * | 9/1999 | .......... G06K/19/00 |
| EP | 1 031 939 A1 | 8/2000 | |
| EP | 1 048 483 A1 | 11/2000 | |
| FR | 2781588 | 1/2000 | |
| FR | 2 781 588 | 1/2000 | |
| JP | 10-261054 | 9/1998 | |
| JP | 11-149536 | 6/1999 | |
| JP | 2000137779 A * | 5/2000 | .......... G06K/19/07 |
| JP | P2000-138621 A | 5/2000 | |
| JP | 2000172812 A * | 6/2000 | .......... G06K/19/07 |
| JP | 2001-005920 | 1/2001 | |
| JP | 2001092929 A * | 4/2001 | .......... G06K/17/00 |
| JP | 2001209757 A * | 8/2001 | .......... G06K/17/00 |
| JP | 2002-203224 A | 7/2002 | |

* cited by examiner

*Primary Examiner*—Thien M. Le
*Assistant Examiner*—Uyen-Chau N. Le
(74) *Attorney, Agent, or Firm*—McDermott Will & Emery LLP

(57) ABSTRACT

When an IC card module is used for a small portable information apparatus such as a portable telephone terminal, the module has a size much smaller than an ordinary IC card from the viewpoint that the apparatus is required to be small in size and weight. In the case of a small non-contact type card, there are problems that an antenna coil cannot secure its necessary surface area, a necessary power cannot be obtained for a signal to be transmitted or received, a communication distance from an external device becomes small. When the signal is transmitted and received via a booster coil provided between the external device and the antenna coil of the IC card module, the effective surface area of the antenna coil can be increased and the communication distance can be increased to a level as large as it can practically avoid involvement of any problem.

7 Claims, 3 Drawing Sheets

PORTABLE INFORMATION PROCESSING APPARATUS

BACKGROUND OF THE INVENTION

The present invention relates to a portable information processing apparatus in which a non-contact information medium including a non-contact IC card can be mounted.

One of related arts is disclosed, e.g., in JP-A-11-149536. There is a description in this Publication saying the effect that "a composite IC card, which includes an IC module with an IC mounted therein and having both contact and non-contact type communication functions and an antenna for non-contact transmission, and wherein coils for signal transmission in the IC module and non-contact transmission antenna are arranged to be closely coupled to each other, that is, the IC module and non-contact transmission antenna are coupled by transformer coupling and are coupled in a non-contacted manner". Another description says therein the effect that "the antenna coil coupled to an external read/write device in a non-contact state is arranged so as not to overlap an engagement portion for the IC module, which is an external terminal region serving as a contact type electrode, an embossing region, or a magnetic stripe region."

Another related art is disclosed in JP-A-2001-5920. This Publication states as follows in the effect. That is, a portable telephone is provided with an interface capable of data communication with a non-contact IC card, a reader/writer is provided with a function of calling the telephone and a function of performing two-way communication with the telephone, and the card and the telephone are arranged adjacent to each other. The reader/writer outputs a transmission signal for calling the telephone all time, the telephone establishes a two-way communication state with the reader/writer in response to the reception of the transmission signal, the telephone also transmits a request signal for requesting communication to the card in response to the reception of the transmission signal, and consequently, a two-way communication state is established between the telephone and the card.

In this conjunction, there are several standards for the non-contact IC card, one of which based on ISO14443 Standard is widely used because the IC card can be used even at a position away by a distance of several to about 10 centimeters from an external reader/writer (which will be referred to merely as RW, hereinafter).

SUMMARY OF THE INVENTION

In fields of portable information apparatuses including a portable information terminal (personal digital assistant (PDA)) and a handheld PC (HPC) developed from a personal computer (abbreviated to PC, hereinafter) having a communication function, and an portable information device such as a portable phone terminal or an electronic wallet including a personal handy phone (PHS); for the purpose of increasing a versatility, there has been appeared an information processing terminal in which an information medium such as an IC card can be mounted. With regard to financial payment or settlement of credit or the like or ticket reservation, for which the user has to actually go to its shop so far, the user can now realize it without actually going out from the terminal regardless of time and place.

Conventionally, many of IC cards used for the above purpose are of a contact type which have electrical contacts for supply of power, clock, data, etc.

Practical use of a non-contact IC card not having any electrical contacts started quickly recently. In particular, telephone card or train pass are being spread due to their good handleability.

An usual non-contact type IC card has the same size as a standard IC card, magnetic card, etc., i.e., about 85×55 mm, as a matter of courses. However, when it is desired to mount the card, in particular, a portable phone terminal, such a card as to have the above size cannot be incorporated in the phone terminal. In these years, there appeared a contact type card called a universal identification module (UIM) having a size of about 15×25 mm for the phone terminal mounting. Since the portable phone terminal is required to be small in size and weight, such a card as to have such a small size seems to be preferable from its future viewpoints.

As well known, the non-contact type IC card has an antenna coil which supplies, in an electromagnetic induction manner, a power to an information processing circuit section incorporated in the card, or which is used to communicate with an external RW. As the IC card is made as small in size as mentioned above, it becomes difficult to obtain such antenna coil as to have both a desired value of surface area and a desired number of turns, which results in that a communication distance between the card and RW becomes short. Even when an antenna coil is actually formed in the size of the above UIM type card, the card can exhibit a communication distance of only about 3 cm, which is estimated highly troublesome from the practical viewpoint. In the case of such a small card, further, the communication electromagnetic wave of the antenna may be undesirably shielded by a battery pack, shield plate, etc. which are originally components of the portable phone terminal, depending on the mounting location of the antenna. Accordingly, its communication distance is estimated to be actually further shorter.

To avoid this, it is considered to form an antenna coil having such a size as conventional one and to mount it outside of a non-contact IC card. However, the use of the antenna coil formed as an independent member separated from the IC card involves not only a problem with the reliability of the connection part but also a problem that the use of such an antenna coil may cause electrostatic destruction of a circuit device in a manufacturing step prior to mounting the antenna coil on the IC card, because the antenna connection terminal of a circuit incorporated in the IC card has to be led out.

This is a new problem when a small non-contact type IC card is used, which is not referred to in related literatures.

It is therefore an object of the present invention to provide an information processing apparatus such as small non-contact type IC card which, even when such a card as mentioned above is mounted to a portable information device, can have a communication distance as long as conventional one from a RW while avoiding problems with reliability and electrostatic destruction.

In accordance with an aspect of the present invention, the above object is attained by providing an information processing apparatus which includes means for mounting a non-contact type information medium and signal receiving/transmitting means for receiving from the non-contact type information medium mounted on the mounting means, transmitting the received signal to an external device, receiving a signal from the external device, and transmitting the received signal to the non-contact type information medium mounted to the mounting means. In particular, it is desirable that the non-contact type information medium be a non-contact IC card, the signal receiving/transmitting means be a booster coil, and the IC card and booster coil be arranged so that a surface formed by the non-contact type IC card is opposed to a surface formed by the booster coil and an electromagnetically shielding object is not provided therebetween.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENTS

Explanation will be made as to an embodiment of the present invention as necessary with reference to the accompanying drawings. The present invention is applicable to various types of information processing apparatuses, in particular, a portable information apparatus. The following explanation will be made in connection with an example of a portable telephone as a representative, but the present invention is not limited to the specific example.

One of feature of the present invention lie in that, when such a small portable information apparatus as, e.g., a portable telephone terminal had a small non-contact type IC card, communication between the IC card and an RW provided outside the portable information apparatus is carried out not directly between respective antenna coils possessed by the IC card and portable information apparatus but indirectly via a resonance coil called a booster coil.

Figure 1A:
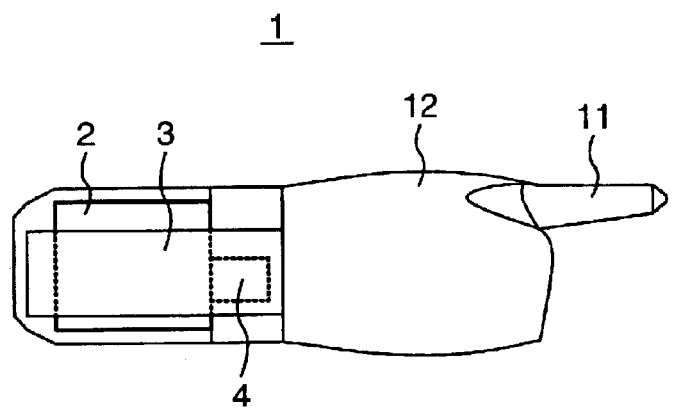
FIGS. 1A and 1B show an example of array of a constituent element in a portable telephone terminal in accordance with the present invention.

First referring to FIGS. 1A and 1B, explanation will be made as to an example of array of a constituent element directly associated with the present invention in a portable telephone terminal. FIG. 1A schematically shows a portable telephone terminal 1 when viewed from its rear side, wherein reference numeral 11 denotes an antenna bar for transmitting and receiving electromagnetic waves used for the portable telephone, and a numeral 12 denotes a main body case of the portable telephone located at the rear side of a display such as a liquid crystal display. Numeral 2 denotes a battery pack, 3 denotes a booster coil, 4 denotes an IC card module, which members are covered with an independent battery lid casing separated from the main body case 12 and cannot be viewed when the portable telephone terminal 1 is actually used. That is, FIG. 1A illustrates the portable telephone terminal with the battery lid casing removed. A constituent element not viewed directly even when the portable telephone terminal is illustrated with the battery lid casing removed is shown by a dotted line. When the portable telephone terminal 1 is viewed from its front, in many cases, a keypad is located on a front side opposed to the battery pack 2, and such a display as mentioned is located on the front side opposed to the main body case 12. There are two types of portable telephone terminals, one is a straight type which is kept to have such a shape as in FIG. 1, and the other is a flipper type which is folded into two, when the keypad and display are accommodated.

In this case, the IC card module is mounted by a suitable mounting means provided in the portable telephone. For example, the mounting means is to provide an insert port for insertion of the IC card module in the portable telephone.

When the display is designed so as to display not only information relating to telephone but also information stored in the IC card module 4, e.g., the expiration date of train pass, pass section, or a mark indicative of normal operation of the IC card module 4, the portable telephone terminal can advantageously increase its use convenience.

Figure 1B:
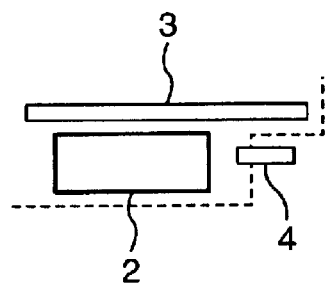

FIG. 1B schematically shows relative positions of the battery pack 2, booster coil 3 and IC card module 4 in their height direction. FIG. 1B corresponds to FIG. 1A but when viewed from its lower side. In the drawing, a broken line indicates an interior partitioned by a plastic material or the like. In the illustrated example, the IC card module 4 is mounted in the form of being inserted in a recess made in the partitioned interior. The insertion and withdrawal of the IC card module 4 are carried out under a condition that the battery pack 2 was removed, but such insertion or withdrawal is not inconvenient because it is not often done. It is desirable that the booster coil 3 be generally larger than the IC card module 4 in area. In the illustrated example, the IC card module 4 is disposed so as to cover most part of the battery pack 2, but the present invention is not limited to such a disposal. The IC card module 4 may be disposed so as to cover the entire of the battery pack 2 or so as to spread into the interior of the main body case 12.

The battery pack 2 may sometimes be formed integrally with a casing (not shown). In this case, it is considered upon the integral formation to dispose the booster coil 3 between the battery pack 2 and the casing or to form the booster coil 3 outside of the casing.

In the example of FIGS. 1A and 1B, since the booster coil 3 and IC card module 4 are disposed so as not to be shielded by the battery pack 2, that is, information to be transmitted or received will not be shielded by the battery pack 2.

Figure 2A:
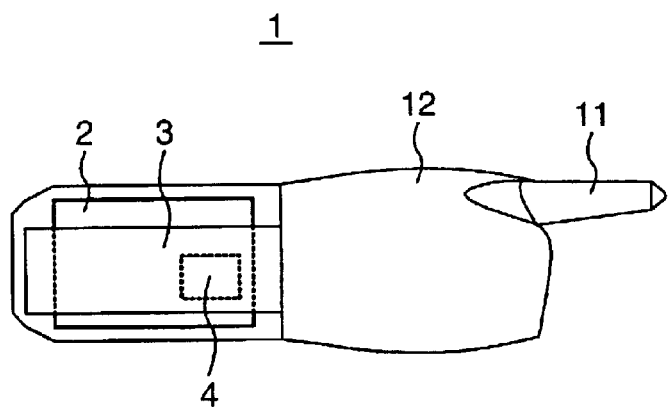
FIGS. 2A and 2B show an example of array of another constituent element in the portable telephone terminal in accordance with the present invention.
Figure 2B:
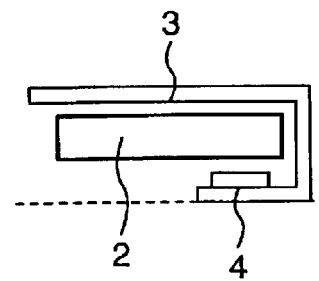

FIGS. 2A and 2B schematically show an example of array of the present invention different from FIGS. 1A and 1B. In this case, the IC card module 4 is positioned in the deep side of the battery pack 2. Even in such a case, the booster coil 3 can function when the portable telephone terminal is of such a straight type as shown in FIG. 1B. However, it is desirable that the booster coil 3 be formed rather with use of such a flexible substrate as shown in FIG. 2B, so that the booster coil can be extended as far as the deep side of the battery pack 2 and can be coupled sufficiently to the IC card module 4.

In the arrangement of FIG. 2B, an electromagnetic field for external transmission and reception and an electromagnetic field for communication with the IC card module 4 are directed in such directions as to cancel each other. However, since the battery pack 2 acts as an object for shielding the electromagnetic field, this will cause no problem.

In FIG. 2B, the booster coil 3 may be located between the battery pack 2 and IC card module 4. In this case, it is also possible to form the booster coil 3 on the casing of the battery pack 2. The booster coil 3 may also be provided to be extended around other sides in the drawing.

In FIGS. 2A and 2B, since the booster coil 3 is extended along the both surfaces of the battery pack 2, this is convenient from the viewpoint that the booster coil 3 can exchange information with an external RW (reader/writer)

even from any of the front and rear surfaces of the portable telephone terminal 1. To this end, a part of the booster coil 3 corresponding to a lower side of the battery pack 2 in FIG. 2B is preferably extended further toward its left side to obtain nearly the same sensitivity for the both surfaces.

Figure 3:
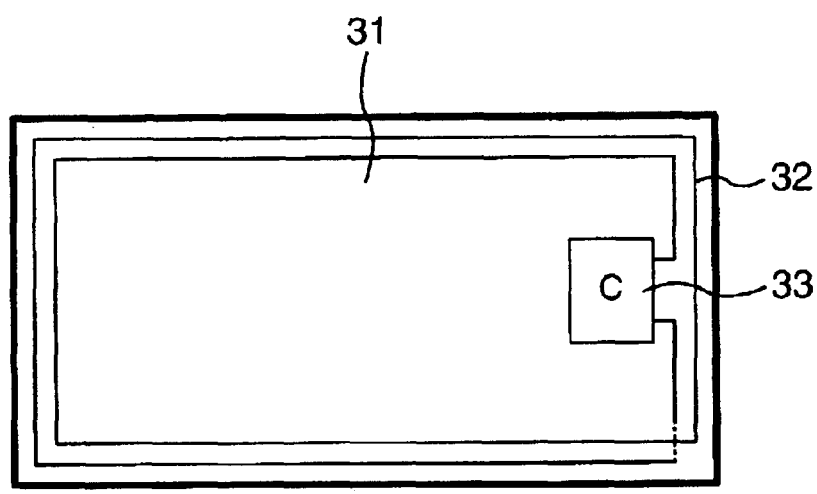
FIG. 3 shows an example of a booster coil in the present invention.

Next, FIG. 3 shows an example of the booster coil 3. Reference numeral 31 denotes a substrate. Used as necessary a flexible substrate as already mentioned above. Numeral 32 denotes an antenna coil printed on the substrate. In this drawing, the antenna coil is illustrated to have two turns, but the present invention is not limited to the specific example. Generally speaking, for the purpose of increasing a coupling degree, the antenna coil is wound by five or more turns in many cases. Numeral 33 denotes a capacitive element which is mounted or formed on the substrate. As will be explained later, the antenna coil is designed preferably so that the capacitive element resonates with the coil in the vicinity of a carrier frequency for a signal to be transmitted or received under a condition that the coil is actually coupled thereto.

In general, the booster coil 3 has desirably a surface area as large as permitted by the apparatus. In the case of a portable information terminal or the like having a large sized liquid crystal display or keypad, when the rear surface of a casing is utilized, a sufficient surface area can be secured.

Figure 4:
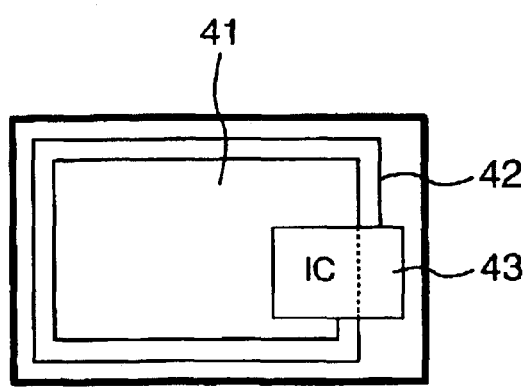
FIG. 4 shows an example of an IC card module in the present invention.

FIG. 4 shows an example of the IC card module 4. Reference numeral 41 denotes a substrate, numeral 42 denotes an antenna coil printed on the substrate, 43 denotes a non-contact type IC as an information processor for performing information processing operation over the non-contact type IC card. Even in this case, the number of turns of the antenna coil is not limited to the illustrated number. The non-contact type IC 43 obtains a power and information from a signal received from the antenna coil 42, and also transmits information to an external device by modulating its load. A microcomputer and a memory having necessary sizes are incorporated in the non-contact type IC 43 so that the IC card has calculating and information storing functions. In this connection, a resonating capacitance similar to in the example of FIG. 3 may be provided even on the substrate 41.

The IC card module 4 in FIG. 4 has a size as large as about 15×25 mm as mentioned above and the antenna coil 42 cannot have a large surface area. Accordingly with it, a communication distance cannot be made so large for information transmission and reception. The booster coil 3 can have a size as large as about 35×50 mm, though it also depends on its terminator. When the booster coil 3 is provided therebetween and its resonating action is used, the antenna coil 42 can have equivalently an increased surface area and thus its communication distance can be increased to such a level as to cause no problem practically.

Further, when it is tried to take a necessary communication distance without using the booster coil 3, the antenna coil 42 cannot be incorporated in the IC card module 4 having a small surface area. Thus a connection terminal is provided to mount the large antenna coil outside the module. In this case, the connection terminal becomes a problem with reliability. That is, before the antenna coil is externally mounted in its manufacturing step, the non-contact type IC 43 may cause its electrostatic destruction. When the booster coil 3 is employed as in the present invention, however, it will not involve such a problem advantageously.

In the case where it is assumed that the booster coil 3 is provided as an intervention, even when the surface area of the antenna coil 42 of the IC card module 4 is made further smaller, this will exert substantially no influence on the communication distance for signal transmission and reception. To this end, it is considered to incorporate the antenna coil 42 into the interior of the non-contact type IC 43 and to form it by an IC process. When the antenna coil 42 and non-contact type IC 43 are integrally formed in this manner, inspection for removing a defective in the non-contact type IC's 43 can be conducted for each single IC in a non-contact state and the likelihood of danger that the IC is destroyed during the inspection can be advantageously reduced.

Although the used IC card module 4 has been of a non-contact type in the foregoing explanation, the module may be of a hybrid type which can function in both contact and non-contact types. The function of the portable telephone can be expanded to a large extent as when the user performs financial settlement using the contact type function of the portable telephone, as when the user purchases a train ticket or commuting ticket and passes through an automatic ticket examining gate machine using the non-contact type function, and so on.

Figure 5:
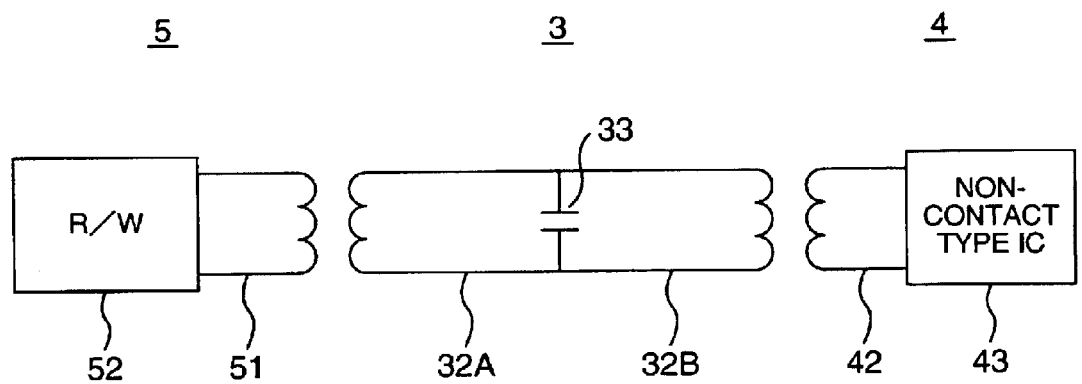
FIG. 5 is an overall system including a RW (reader/writer).

Shown in FIG. 5 is an entire system including an external RW (reader/writer). In the drawing, reference numeral 5 denotes an RW, numeral 51 denotes an antenna coil, 52 denotes an RW main body which has an information processing circuit or the like. The antenna coil 32 in the interior of the booster coil 3 is illustrated as divided into two parts 32A and 32B for convenience of illustration. Information to be transmitted from the RW 5 to the IC card module 4 is modulated with a carrier and then transmitted from the antenna coil 51. The information is received at the antenna coil 32A of the booster coil 3. Since the booster coil 3 has a large surface area as mentioned above and the resonance frequency of the capacitive element 33 is set to be nearly equal to the frequency of the above carrier, a receivable power is large. For this reason, the information is given with such a large power from the antenna coil 32B to the antenna coil 42 of the IC card module 4 and further to the non-contact type IC 43. In this way, since the IC card can receive much power, its communication distance can be made advantageously larger than that when communication was carried out between the antenna coil 51 and antenna coil 42 directly without any intervention of the booster coil 3.

Even when information is transmitted from the IC card module 4 to the RW 5, substantially the same effect can be obtained.

In FIG. 5, the booster coil 3 was depicted as divided into the antenna coils 32A and 32B. Although substantially the same effect can be obtained even when separated coils are actually formed as illustrated. However, a single coil may be provided as shown in FIG. 3, as a matter of course. When the two coils 32A and 32B are actually used, the capacitive element 33 may be located at such a position as to produce parallel resonance with the two coils as shown in FIG. 5 or at such a position as to produce series resonance.

An actual resonance frequency is somewhat different, in many cases, from the resonance frequency of the single booster coil 3. This is because of the influence of the impedances of the IC card module 4 and RW 5 when viewed from the booster coil 3 and also because of the influences of constituent elements adjacent to the battery pack 2 and so on shown in FIGS. 1A, 1B, 2A and 2B. When the resonance frequency is adjusted so as to take the above influences into consideration, it is desirable that these influences be previously taken into consideration or be actually incorporated into the apparatus for adjustment.

In this connection, the arrangement of the IC card module 4, booster coil 3 and battery pack 2 is not limited to the arrangement shown in the above explanation. Further the above explanation has been made in connection with the example of the portable telephone, but the present invention can be similarly applied even to another portable information apparatus or information processing apparatus. At that time, it is desirable that the surface formed by the non-contact type IC card be opposed to the surface formed by the booster coil and no electromagnetic shielding object be provided between the surfaces.

As has been explained in the foregoing, in accordance with the present invention, when a small non-contact type card module is used in an information processing apparatus, a problem that a suitable communication distance from an external device cannot be secured because of its small size can be solved, that is, a desired communication distance can be secured and its convenience of use can advantageously be improved. Further, a problem with the reliability of the non-contact type card module or a danger of causing electrostatic destruction can also be avoided advantageously.

While we have shown and describe several embodiments in accordance with our invention, it should be understood that disclosed embodiments are susceptible of changes and modifications without departing from the scope of the invention. Therefore, we do not intend to be bound by the details shown and described herein but intend to cover all such changes and modifications fallen within the scope of the appended claims.

What is claimed is:

1. A non-contact information medium mounted in a first information processing apparatus for transmitting and receiving information to and from a second information processing apparatus via the first information processing apparatus, comprising:

a substrate mountable to mounting means possessed by the first information processing apparatus;

an antenna coil for transmitting and receiving information to and from signal transmitting/receiving unit possessed by the first information processing apparatus through electromagnetic induction;

an information processor to process information to be transmitted and received to and from the antenna coil; and a booster coil for transmitting/receiving information by way of electromagnetic induction with the second information processing apparatus, the booster coil mounted in the first information processing apparatus such that a surface of the booster coil opposes a surface of the antenna coil, the booster coil configured for clamping a batter pack for supplying electrical power to the first information processing apparatus.

2. The non-contact information medium according to claim 1, wherein said antenna coil and said information processor are integrally formed on a semiconductor chip.

3. An information processing apparatus comprising;

a booster coil for transmitting/receiving information by way of electromagnetic induction with an external apparatus for transmitting/receiving information;

a mounting member for mounting non-contact information medium having antenna coil for transmitting/receiving information by utilizing electromagnetic induction with said booster coil;

said booster coil and said mounting member being arranged so that a surface made by said booster coil is opposed to a surface formed by said antenna coil;

wherein said booster coil is arranged for clamping a battery pack for supplying electric power to said information processing apparatus.

4. An information processing apparatus according to claim 3, wherein said booster coil has a surface for communicating with said antenna coil is enlarged for communication with an external communication apparatus.

5. An information processing apparatus according to claim 3, wherein said booster coil is formed on a deformable flexible substrate.

6. The information processing apparatus according to claim 3, wherein said portable information apparatus includes a main body casing and a battery lid casing, and said battery lid casing is provided with said booster coil.

7. The information processing apparatus according to claim 3, wherein an antenna coil possessed by said non-contact information medium is integrally formed on a semiconductor chip forming the non-contact information medium.

* * * * *